(12) United States Patent
Lee et al.

(10) Patent No.: US 8,048,808 B2
(45) Date of Patent: Nov. 1, 2011

(54) SLURRY COMPOSITIONS FOR POLISHING METAL, METHODS OF POLISHING A METAL OBJECT AND METHODS OF FORMING A METAL WIRING USING THE SAME

(75) Inventors: Jong-Won Lee, Seongnam-si (KR); Sang-Yeob Han, Anyang-si (KR); Chang-Ki Hong, Seongnam-si (KR); Bo-Un Yoon, Seoul (KR); Jae-Dong Lee, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 599 days.

(21) Appl. No.: 12/213,941

(22) Filed: Jun. 26, 2008

(65) Prior Publication Data
US 2009/0001051 A1 Jan. 1, 2009

(30) Foreign Application Priority Data
Jun. 29, 2007 (KR) .................. 10-2007-0065615

(51) Int. Cl.
*H01L 21/302* (2006.01)

(52) U.S. Cl. ..... 438/690; 252/79.1; 252/79.2; 252/79.3; 252/79.4; 216/88; 438/689; 438/691; 438/692; 438/693

(58) Field of Classification Search ........ 252/79.1–79.4; 216/88; 438/689–693
See application file for complete search history.

(56) References Cited

U.S. PATENT DOCUMENTS

| | | | |
|---|---|---|---|
| 6,540,935 B2 | 4/2003 | Lee et al. | |
| 7,247,566 B2 * | 7/2007 | Carter et al. | 438/692 |
| 7,842,191 B2 * | 11/2010 | Minamihaba et al. | 252/79.1 |
| 2007/0298611 A1 * | 12/2007 | Bian | 438/685 |

FOREIGN PATENT DOCUMENTS

| | | |
|---|---|---|
| JP | 2000-109818 | 4/2000 |
| JP | 2007-053214 | 3/2007 |
| KR | 10-2002-0077636 A | 10/2002 |
| KR | 10-2004-0055042 A | 6/2004 |
| KR | 0495975 B1 | 6/2005 |

* cited by examiner

*Primary Examiner* — Nadine G Norton
*Assistant Examiner* — Maki A Angadi
(74) *Attorney, Agent, or Firm* — Lee & Morse, P.C.

(57) ABSTRACT

A slurry composition for polishing metal includes a polymeric polishing accelerating agent, the polymeric polishing accelerating agent including a backbone of hydrocarbon and a side substituent having at least one of a sulfonate ion ($SO_3^-$) and a sulfate ion ($OSO_3^-$), and an acidic aqueous solution.

11 Claims, 4 Drawing Sheets

SLURRY COMPOSITIONS FOR POLISHING METAL, METHODS OF POLISHING A METAL OBJECT AND METHODS OF FORMING A METAL WIRING USING THE SAME

BACKGROUND OF THE INVENTION

1. Field of the Invention

Example embodiments of the present invention relate to slurry compositions for polishing metal, methods of polishing a metal object, and methods of forming a metal wiring using the same. More particularly, example embodiments of the present invention relate to slurry compositions for polishing metal that may be used in a semiconductor manufacturing process, methods of polishing a metal object, and methods of forming a metal wiring using the same.

2. Description of the Related Art

A semiconductor manufacturing process may generally include forming a layer, e.g., an insulation layer or a conductive layer, on a substrate, planarizing a surface of the layer, etching the layer to form a pattern having a predetermined shape, or the like. For example, a conductive layer may be formed on a substrate, followed by planarizing and etching thereof to form an electrode, a wiring, or a contact plug, e.g., to electrically connect two conductive structures to each other.

A conventional planarizing process may include, e.g., an etch-back process, a reflow process, a chemical mechanical polishing (CMP) process, or the like. For example, in the CMP process, a substrate, i.e., a semiconductor wafer, coated with a conductive layer may be mechanically polished by rubbing a surface thereof against a slurry composition and a polishing pad, and may be also chemically removed by a chemical reaction between the slurry composition and the surface of the conductive layer.

A polishing efficiency of the CMP process may be determined, e.g., by a type of a CMP apparatus, components of the slurry composition, a type of the polishing pad, and so forth. For example, the slurry composition in the CMP process should be able to rapidly polish the conductive layer on the substrate. A conventional slurry composition having a high polishing rate, however, may have strong corrosive properties, so excessive portions of the conductive layer may be removed. For example, a conventional slurry composition having strong corrosive properties may excessively etch a top portion of a metal wiring layer on the substrate to generate seams in the metal wiring layer, i.e., holes on a top portion of a layer to be polished. Seams in the metal wiring layer may increase electrical resistance of the layer, so performance of the semiconductor device may be deteriorated.

SUMMARY OF THE INVENTION

Embodiments of the present invention are therefore directed to slurry compositions for polishing metal, methods of polishing a metal object, and methods of forming a metal wiring using the same, which substantially overcome one or more of the disadvantages and shortcomings of the related art.

It is therefore one example embodiment of the present invention to provide a slurry composition with a polishing accelerating agent capable of increasing metal polishing rate, while reducing the metal corrosiveness.

It is another example embodiment of the present invention to provide a method of polishing a metal object using a slurry composition with a polishing accelerating agent capable of increasing the metal polishing rate, while reducing the metal corrosiveness.

It is yet another example embodiment of the present invention to provide a method of forming a metal wiring using a slurry composition with a polishing accelerating agent capable of increasing the metal polishing rate, while reducing the metal corrosiveness.

At least one of the above and other example embodiments of the present invention may provide a slurry composition for polishing metal, including a polymeric polishing accelerating agent, the polymeric polishing accelerating agent including a backbone of hydrocarbon and a side substituent having at least one of a sulfonate ion ($SO_3^-$) and a sulfate ion ($OSO_3^-$), and an acidic aqueous solution with an abrasive. The polymeric polishing accelerating agent may include a polymer having at least one of repeating units represented by Formula 1 and Formula 2, wherein $R_1$ and $R_2$ independently represent a hydrogen atom or a $C_1$-$C_4$ alkyl group, $X^+$ and $Y^+$ independently represent a hydrogen ion, an alkali metal ion, an ammonium ion, or a $C_1$-$C_{10}$ alkylammonium ion, and $n_1$ and $n_2$ independently represent an integer in a range of about 10 to about 5,000. The polymeric polishing accelerating agent may include one or more of a homopolymer having a repeating unit represented by Formula 1 or Formula 2, a copolymer having a repeating unit represented by Formula 1 and a repeating unit represented by Formula 2, a copolymer having at least one repeating unit represented by Formula 1 or Formula 2 and at least one repeating unit including a vinyl monomer, an acryl monomer, an alkylene oxide monomer, or an olefin monomer.

The slurry composition may include the polymeric polishing accelerating agent in an amount of about 0.0001% to about 1% by weight based on a total weight of the slurry composition. The slurry composition may include the polymeric polishing accelerating agent in an amount of about 0.001% to about 0.1% by weight based on a total weight of the slurry composition. The slurry composition may include the polymeric polishing accelerating agent in an amount of about 0.001% to about 0.05% by weight based on a total weight of the slurry composition. The acidic aqueous solution may further include an oxidizing agent, a metal catalyst, and water. The acidic aqueous solution may include the abrasive in an amount of about 0.1% to about 20% by weight, an oxidizing agent in an amount of about 0.1% to about 10% by weight, and a metal catalyst in an amount of about 0.0001% to about 1% by weight, based on a total weight of the composition. The slurry composition may further include salt of an aromatic carboxylic acid. The slurry composition may include the salt of the aromatic carboxylic acid in an amount of about 0.001% to about 0.5% by weight based on a total weight of the composition. The salt of the aromatic carboxylic acid may include potassium hydrogen phthalate.

At least one of the above and other example embodiments of the present invention may also provide a method of polishing a metal object, including preparing a slurry composition including a polymeric polishing accelerating agent and an acidic aqueous solution with an abrasive, the polymeric polishing accelerating agent including a backbone of hydrocarbon and a side substituent having at least one of a sulfonate ion ($SO_3^-$) and a sulfate ion ($OSO_3^-$), providing the slurry composition to a polishing pad, and polishing a surface of the metal object by contacting the metal object with the polishing pad. The polymeric polishing accelerating agent may include a polymer having at least one of repeating units represented by Formula 1 and Formula 2, Formula 1

Formula 2 wherein $R_1$ and $R_2$ independently represent a hydrogen atom or a $C_1$-$C_4$ alkyl group, $X^+$ and $Y^+$ independently represent a hydrogen ion, an alkali metal ion, an ammonium ion, or a $C_1$-$C_{10}$ alkylammonium ion, and $n_1$ and $n_2$ independently represent an integer in a range of about 10 to about 5,000. The metal object may include at least tungsten. The slurry composition may have a pH in range of about 2 to about 4.

At least one of the above and other example embodiments of the present invention may also provide a method of forming a metal wiring, including forming a conductive structure on a substrate, forming an insulation layer on the substrate to cover the conductive structure, partially removing the insulation layer to form an opening in the insulation layer, the opening exposing the conductive structure, forming a metal layer on the insulation layer to fill the opening, and polishing the metal layer using a slurry composition to form the metal wiring in the opening, the slurry composition including a polymeric polishing accelerating agent and an acidic aqueous solution with an abrasive, the polymeric polishing accelerating agent including a backbone of hydrocarbon and a side substituent having at least one of a sulfonate ion ($SO_3^-$) and a sulfate ion ($OSO_3^-$). The polymeric polishing accelerating agent may include a polymer having at least one of repeating units represented by Formula 1 and Formula 2, Formula 1

Formula 2 wherein $R_1$ and $R_2$ independently represent a hydrogen atom or a $C_1$-$C_4$ alkyl group, $X^+$ and $Y^+$ independently represent a hydrogen ion, an alkali metal ion, an ammonium ion, or a $C_1$-$C_{10}$ alkylammonium ion, and $n_1$ and $n_2$ independently represent an integer in a range of about 10 to about 5,000. The metal layer may include at least tungsten.

BRIEF DESCRIPTION OF THE DRAWINGS

Example embodiments will be more clearly understood from the following detailed description taken in conjunction with the accompanying drawings, in which.

DETAILED DESCRIPTION OF THE INVENTION

Korean Patent Application No. 10-2007-0065615, filed on Jun. 29, 2007, in the Korean Intellectual Property Office, and entitled: "Slurry Compositions for Polishing Metal, Methods of Polishing a Metal Object and Methods of Forming a Metal Wiring Using the Same," is incorporated by reference herein in its entirety.

Exemplary embodiments of the present invention will now be described more fully hereinafter with reference to the accompanying drawings, in which exemplary embodiments of the invention are illustrated. Aspects of the invention may, however, be embodied in different forms and should not be construed as limited to the embodiments set forth herein. Rather, these embodiments are provided so that this disclosure will be thorough and complete, and will fully convey the scope of the invention to those skilled in the art.

In the figures, the dimensions of elements, layers, and regions may be exaggerated for clarity of illustration. It will also be understood that when an element and/or layer is referred to as being "on" another element, layer and/or substrate, it can be directly on the other element, layer, and/or substrate, or intervening elements and/or layers may also be present. Further, it will be understood that the term "on" can indicate solely a vertical arrangement of one element and/or layer with respect to another element and/or layer, and may not indicate a vertical orientation, e.g., a horizontal orientation. In addition, it will also be understood that when an element and/or layer is referred to as being "between" two elements and/or layers, it can be the only element and/or layer between the two elements and/or layers, or one or more intervening elements and/or layers may also be present. Further, it will be understood that when an element and/or layer is referred to as being "connected to" or "coupled to" another element and/or layer, it can be directly connected or coupled to the other element and/or layer, or intervening elements and/or layers may be present. Like reference numerals refer to like elements throughout.

As used herein, the expressions "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C" and "A, B, and/or C" includes the following meanings: A alone; B alone; C alone; both A and B together; both A and C together; both B and C together; and all three of A, B, and C together. Further, these expressions are open-ended, unless expressly designated to the contrary by their combination with the term "consisting of." For example, the expression "at least one of A, B, and C" may also include an nth member, where n is greater than 3, whereas the expression "at least one selected from the group consisting of A, B, and C" does not.

As used herein, the terms "a" and "an" are open terms that may be used in conjunction with singular items or with plural items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of embodiments of the present invention.

Spatially relative terms, such as "beneath," "below," "lower," "above," "upper" and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments of the present invention are described herein with reference to cross-section illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Slurry Composition for Polishing Metal

According to example embodiments of the present invention, a slurry composition for polishing metal may include a polymeric polishing accelerating agent and an acidic aqueous solution. The slurry composition for polishing metal may enhance a polishing rate of metal, e.g., tungsten, may increase dispersibility of an abrasive in the slurry composition, and may reduce or suppress corrosion of the metal, as compared with a conventional slurry composition.

The polymeric polishing accelerating agent of the slurry composition may include a backbone of hydrocarbon and a side substituent having at least one of a sulfonate ion ($SO_3^-$) and a sulfate ion ($OSO_3^-$). The polymeric polishing accelerating agent may increase the polishing rate of the metal, while reducing corrosion of the metal. In other words, while, conventionally, chemical components contributing to a high polishing rate may be strongly corrosive, the polymeric polishing accelerating agent according to embodiments of the present invention may increase the polishing rate of the metal, while suppressing corrosion thereof. Additionally, the polymeric polishing accelerating agent may improve the dispersibility of an abrasive in the slurry composition.

The polymeric polishing accelerating agent may include a polymer having at least one of repeating units represented by Formula 1 and Formula 2, Formula 1

Formula 2 wherein $R_1$ and $R_2$ independently denote a hydrogen atom or a $C_1$-$C_4$ alkyl group, $X^+$ and $Y^+$ independently denote a hydrogen ion, an alkali metal ion, an ammonium ion, or a $C_1$-$C_{10}$ alkylammonium ion, and $n_1$ and $n_2$ independently denote an integer in a range of about 10 to about 5,000. Examples of the $C_1$-$C_4$ alkyl group may include a methyl group, an ethyl group, a propyl group, and a butyl group. Examples of the $C_1$-$C_{10}$ alkylammonium ion may include a methylammonium ion, an ethylammonium ion, a propylammonium ion, a butylammonium ion, a dimethylammonium ion, a diethylammonium ion, a trimethylammonium ion, a tetramethylammonium ion, a dimethyldiethylammonium ion, a tetraethylammonium ion, and the like.

For example, the polymeric polishing accelerating agent may include a homopolymer having a repeating unit represented by Formula 1 or Formula 2, a copolymer having a repeating unit represented by Formula 1 and a repeating unit represented by Formula 2, and/or a copolymer having at least one of repeating units represented by Formula 1 and Formula 2 and an additional repeating unit, e.g., one or more of a vinyl monomer, an acryl monomer, an alkylene oxide monomer, and an olefin monomer. Examples of the polymeric polishing accelerating agent may include poly(vinyl sulfonic acid), poly(vinyl sulfonic acid salt), poly(vinyl sulfate), a copolymer of vinyl sulfonic acid (salt) and vinyl sulfate, and the like. Additionally, examples of the polymeric polishing accelerating agent may include a copolymer of both a vinyl monomer having a side substituent with at least one of a sulfonate ion ($SO_3^-$) and a sulfate ion ($OSO_3^-$), and a monomer, e.g., vinyl chloride, vinyl alcohol, vinyl ester, styrene, a (meth)acrylate, a (meth)acrylic acid, an ethylene oxide monomer, a propylene oxide monomer, an ethylene monomer, a propylene monomer, and the like.

A weight-average molecular weight of the polymeric polishing accelerating agent may be in a range of about 10,000 to about 200,000. A polymeric polishing accelerating agent having a weight-average molecular weight between about 10,000 to about 200,000 may improve viscosity and dispersion stability of the slurry composition.

An amount of the polymeric polishing accelerating agent in the slurry composition may be in a range of about 0.0001% to about 1% by weight, based on a total weight of the slurry composition, e.g., in a range of about 0.001% to about 0.1% by weight, in a range of about 0.001% to about 0.05% by weight, in a range of about 0.003% to about 0.07% by weight, in a range of about 0.005% to about 0.05% by weight, and so forth. When the slurry composition includes less than about 0.0001% by weight of the polymeric polishing accelerating agent, an increase of the polishing rate of the slurry composition for metal may not be substantial. When the slurry composition includes more than about 1% by weight of the polymeric polishing accelerating agent, the polishing rate may be unsteady or may be decreases, so corrosion-inhibiting characteristics of the polymeric polishing accelerating agent may not be substantially improved.

The acidic aqueous solution of the slurry composition may include an oxidizing agent, an abrasive, and water. The oxidizing agent may oxidize the metal to be polished, and the abrasive may polish the metal through friction.

Examples of the oxidizing agent in the slurry composition for polishing metal may include a peroxide compound or an inorganic acid. Examples of the peroxide compound may include one or more of hydrogen peroxide, urea peroxide, percarbonate, benzoyl peroxide, peracetic acid, di-t-butyl peroxide, monopersulfate, dipersulfate, sodium peroxide, potassium peroxide, periodic acid, periodate salt, perbromate salt, perchloric acid, perchlorate salt, perboric acid, perborate salt, permanganate salt, and the like. Examples of the inorganic acid may include one or more of nitric acid, sulfuric acid, hydrochloric acid, phosphoric acid, and the like. An amount of the oxidizing agent may be adjusted with respect to the polishing rate and corrosion characteristics of the metal. For example, an amount of the oxidizing agent in the slurry composition may be about 0.1% to about 10% by weight, based on the total weight of the slurry composition.

Examples of the abrasive in the slurry composition may include a metal oxide, e.g., one or more of a cerium oxide, a silicon oxide, an aluminum oxide, a zirconium oxide, a titanium oxide, a germanium oxide, and the like. For example, use of a cerium oxide may improve the planarity of the polished metal. An amount of the abrasive in the slurry composition may be adjusted with respect to the dispersibility thereof in the slurry composition and the planarity of the metal. For example, an amount of the abrasive in the slurry composition may be about 0.1% to about 20% by weight, based on the total weight of the slurry composition.

The acidic aqueous solution of the slurry composition may further include a metal catalyst. The metal catalyst may promote electron transfer from the metal to be oxidized to the oxidizing agent, i.e., the metal catalyst may improve the polishing rate. The metal catalyst may have multiple oxidation states. Examples of the metal catalyst may include a salt of a metal, e.g., iron, cobalt, nickel, silver, copper, chromium, molybdenum, manganese, niobium, palladium, ruthenium, tin, titanium, vanadium, and the like. Examples of the metal catalyst may include an inorganic salt of iron (II, III), e.g., one or more of an iron nitrate, an iron sulfate, an iron halogenide, and the like, and/or an organic salt of iron (II, III), e.g., one or more of an iron perchlorate, an iron perbromate, an iron periodate, an iron acetate, an iron acetylacetonate, an iron citrate, an iron gluconate, an iron oxalate, an iron phthalate, an iron succinate, and the like. An amount of the metal catalyst in the slurry composition may be adjusted with respect to a type or an amount of the oxidizing agent. For example, an amount of the metal catalyst in the slurry composition may be about 0.0001% to about 1% by weight, based on the total weight of the slurry composition.

The acidic aqueous solution of the slurry composition may further include an organic acid, e.g., a carboxylic acid. The organic acid may stabilize the oxidizing agent to improve the stability and polishing reproducibility of the slurry composition. Examples of the organic acid may include one or more of acetic acid, citric acid, glutaric acid, glycolic acid, formic acid, lactic acid, malic acid, maleic acid, oxalic acid, phthalic acid, succinic acid, tartaric acid, and the like. An amount of the organic acid in the slurry composition may be adjusted with respect to stability of the oxidizing agent and dispersibility thereof in the slurry composition to provide improvement thereof. For example, the amount of the organic acid in the slurry composition may be in a range of about 0.01% to about 10% by weight, based on the total weight of the slurry composition.

The acidic aqueous solution of the slurry composition may further include a salt of an aromatic carboxylic acid. The salt of the aromatic carboxylic acid may inhibit metal corrosion, so generation of seams or holes in the metal, e.g., in a metal plug or in a metal wiring, may be suppressed or substantially reduced. Examples of the salt of the aromatic carboxylic acid may include one or more of phthalic acid salt, terephthalic acid salt, isophthalic acid salt, benzoic acid salt, naphthalene dicarboxylic acid salt, trimellitic acid salt, trimesic acid salt, biphentyldicarboxylic acid salt, and the like. An amount of the salt of the aromatic carboxylic acid in the slurry composition may be about 0.001% to about 0.5% by weight based on the total weight of the slurry composition, e.g., in a range of about 0.005% to about 0.1% by weight. When the slurry composition include less than about 0.001% by weight of the salt of the aromatic carboxylic acid, corrosion of the metal may not be sufficiently inhibited. When the slurry composition includes more than about 0.5% by weight of the salt of the aromatic carboxylic acid, the corrosion-inhibiting ability of the slurry composition may not steadily increase, and the polishing rate and polishing efficiency of the slurry composition may be reduced.

The slurry composition may further include a pH-controlling agent to adjust a pH range of the slurry composition with respect to a type of a layer to be polished. Examples of the pH-controlling agent may include one or more of an inorganic acid, an organic acid, ammonium hydroxide, potassium hydroxide, sodium hydroxide, and the like. For example, when the layer to be polished includes tungsten, the slurry composition may have a pH in a range of about 2 to about 4. In another example, when the layer to be polished includes aluminum or copper, the slurry composition may have a pH in a range of about 4 to about 6.

A slurry composition for polishing metal according to embodiments of the present invention may exhibit a high polishing rate of metal, reduced corrosiveness of the metal during polishing, and enhanced abrasive dispersibility therein. Therefore, the slurry composition according to embodiments of the present invention may rapidly polish a metal with a high degree of planarization, and may suppress generation of defects, e.g., seams or voids, in the polished metal, e.g., a metal plug or a metal wiring. As a result, the performance of a semiconductor device and a manufacturing yield thereof may be greatly improved.

Method of Polishing a Metal Object

Figure 1:
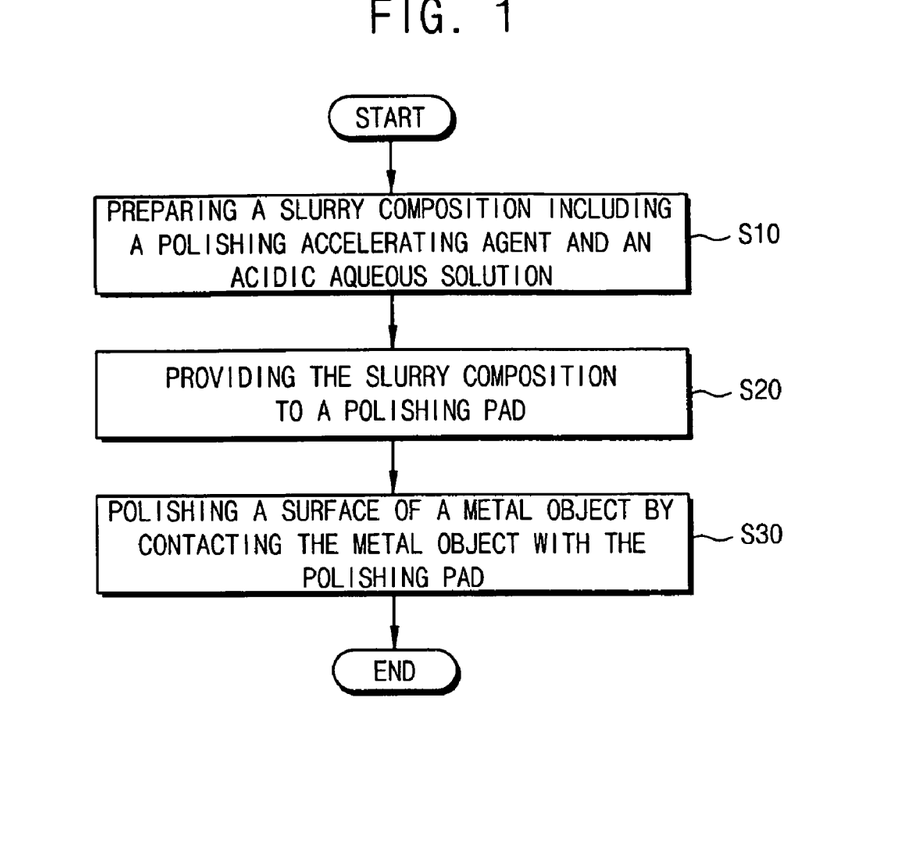
FIG. 1 illustrates a flowchart of a method of polishing a metal object in accordance with example embodiments of the present invention.

Example embodiments of a method of polishing a metal will be described with reference to the accompanying drawing. FIG. 1 illustrates a flowchart of sequential stages in a method of polishing a metal object in accordance with example embodiments of the present invention.

Referring to FIG. 1, as illustrated in step S10, a slurry composition may be prepared to include a polymeric polishing accelerating agent and an acidic aqueous solution. The polymeric polishing accelerating agent may include a backbone of hydrocarbon and a side substituent having at least one of a sulfonate ion ($SO_3^-$) and a sulfate ion ($OSO_3^-$), and the acidic aqueous solution may include an abrasive, an oxidizing agent, and water. The slurry composition prepared in step S10 may be substantially same as the slurry composition described previously, and therefore, detailed description of its components and properties will not be repeated.

As illustrated in step S20, the slurry composition may be provided to a polishing pad. The slurry composition may be between the polishing pad and the metal object.

As illustrated in S30, the polishing pad may contact the metal object to provide polishing of a surface of the metal object. The metal object may include a metal, e.g., one or more of tungsten, aluminum, copper, and the like. The polishing pad may contact the metal object with the slurry composition therebetween, so the polishing pad and the metal object may be rotated either in a same direction or in opposite directions. The polishing pad may apply pressure to the metal object, so the metal object may be rubbed by the polishing pad and the slurry composition. As a result, an outermost portion of the metal object may be removed.

The metal object may be chemically polished by the slurry composition, and may be mechanically polished by rotation, pressure, and friction with the polishing pad and the abrasive in the slurry composition. The oxidizing agent, e.g., a peroxide compound or an acid included in the slurry composition, may oxidize the metal in the metal object to form a metal oxide, so the metal oxide may be mechanically removed from the metal object by rubbing with the abrasive in the slurry composition.

Method of Forming a Metal Wiring

Example embodiments of a method of forming a metal wire will be described with reference to the accompanying drawings. FIGS. 2A-2D illustrate cross-sectional views of sequential stages in a method of forming a metal wiring in accordance with example embodiments of the present invention.

Figure 2A:
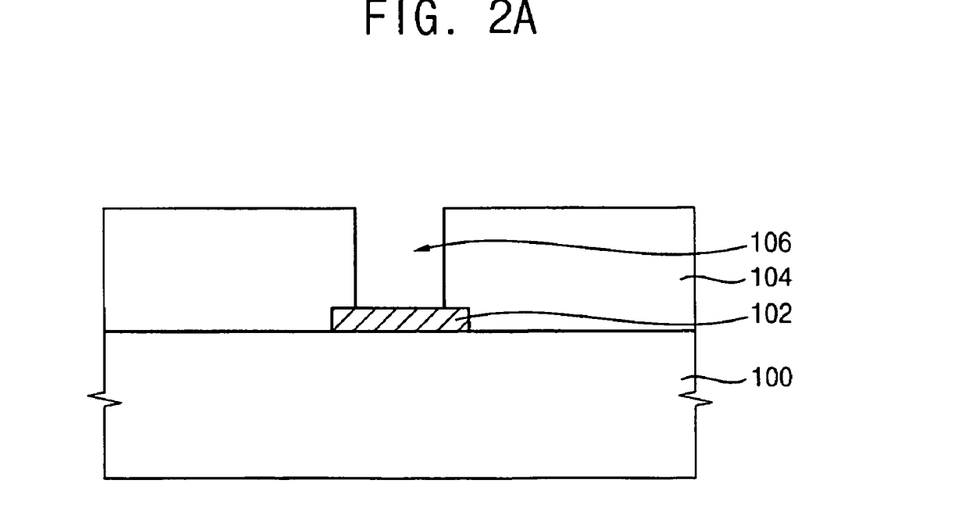
FIGS. 2A-2D illustrate cross-sectional views of sequential stages in a method of forming a metal wiring in accordance with example embodiments of the present invention.

Referring to FIG. 2A, a conductive structure 102 may be formed on a substrate 100. Examples of the conductive structure 102 may include a contact region doped with impurities positioned at an upper portion of the substrate 100, a gate electrode, a capacitor electrode, a contact, a plug, or the like.

An insulation layer 104 may be formed on the substrate 100 to cover an upper surface of the substrate 100 and the conductive structure 102. The insulation layer 104 may be formed using an insulation material, e.g., one or more of an oxide, a nitride, an oxynitride, and the like. For example, the oxide of the insulation layer 104 may include silicon oxide, e.g., one or more of phosphosilicate glass (PSG), borophosphosilicate glass (BPSG), undoped silicate glass (USG), spin-on glass(SOG), tetraethyl orthosilicate (TEOS), plasma-enhanced TEOS (PE-TEOS), high-density plasma chemical vapor deposition (HDP-CVD) oxide, and the like. The insulation layer 104 may be formed to have a thickness sufficient to cover the conductive structure 102.

A photoresist film (not illustrated) may be formed on the insulation layer 104. An exposure process and a developing process may be carried out on the photoresist film to form a photoresist pattern on the insulation layer 104. The insulation layer 104 may be partially removed using the photoresist pattern as an etching mask to form an opening 106 in the insulation layer 104. The opening 106 may expose at least a portion of the conductive structure 102. For example, the opening 106 may be formed to have a round shape or a pattern shape extending in a predetermined direction, so a portion of an upper surface of the conductive structure 102 may be exposed through the opening 106.

Figure 2B:
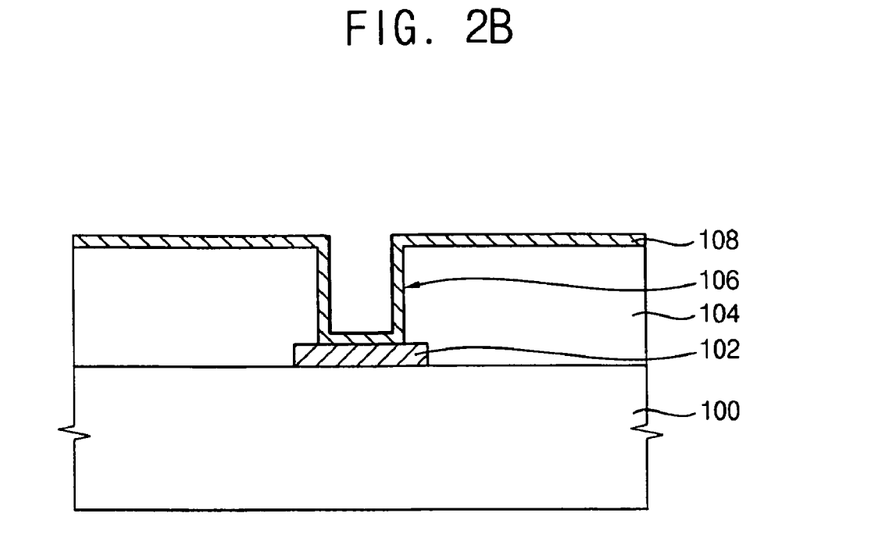

Referring to FIG. 2B, a barrier layer 108 may be formed to a predetermined thickness on the insulation layer 104 having the opening 106. The barrier layer 108 may be formed on an upper surface of the insulation layer 104 and on inner surface of the opening 106, i.e., on a bottom portion and on sidewalls of the opening 106.

The barrier layer 108 may be formed of a material capable of inhibiting or suppressing metal diffusion into the insulation layer 104, e.g., diffusion from a metal wiring 112 (see FIG. 2D) formed in a subsequent process on the insulation layer 104 and in the opening 106. Further, the barrier layer 108 may be formed to have good adhesion to an underlying layer, low contact resistance, high resistance against thermal or mechanical stress, and low electrical conductivity. For example, the barrier layer 108 may be formed of one or more of titanium, titanium nitride, tantalum, tantalum nitride, and the like. The barrier layer 108 may be formed by, e.g., a CVD process, a sputtering process, an atomic layer deposition (ALD) process, and the like.

Figure 2C:
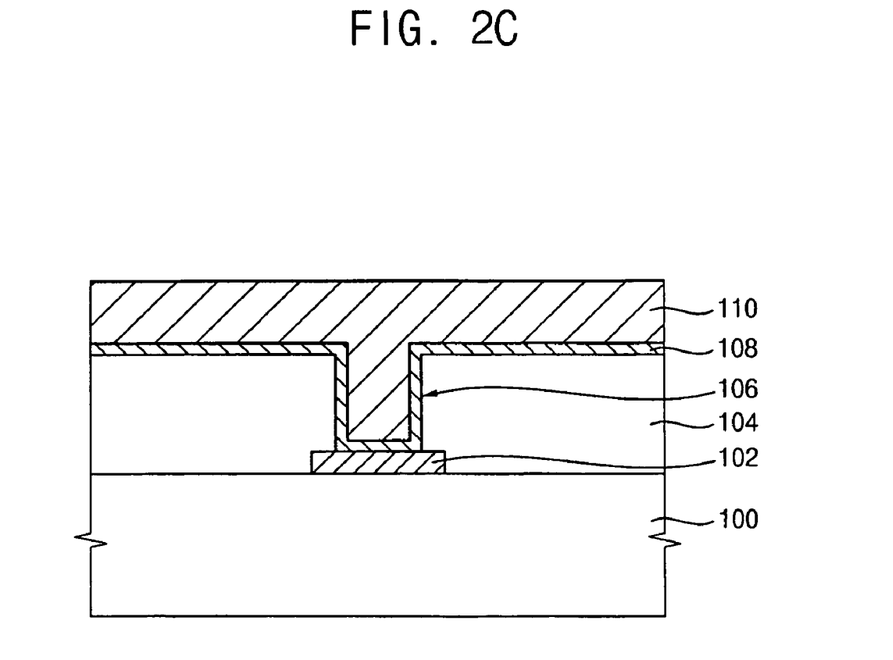

Referring to FIG. 2C, a metal layer 110 may be formed on the barrier layer 108 to fill the opening 106. The metal layer 110 may be formed using a metal, e.g., one or more of tungsten, aluminum, copper, and the like. For example, the metal layer 110 may be formed using tungsten to reduce the electrical resistance of the metal wiring 112 (in FIG. 2D). The metal layer 110 may be formed by, e.g., a sputtering process, a CVD process or the like.

Figure 2D:
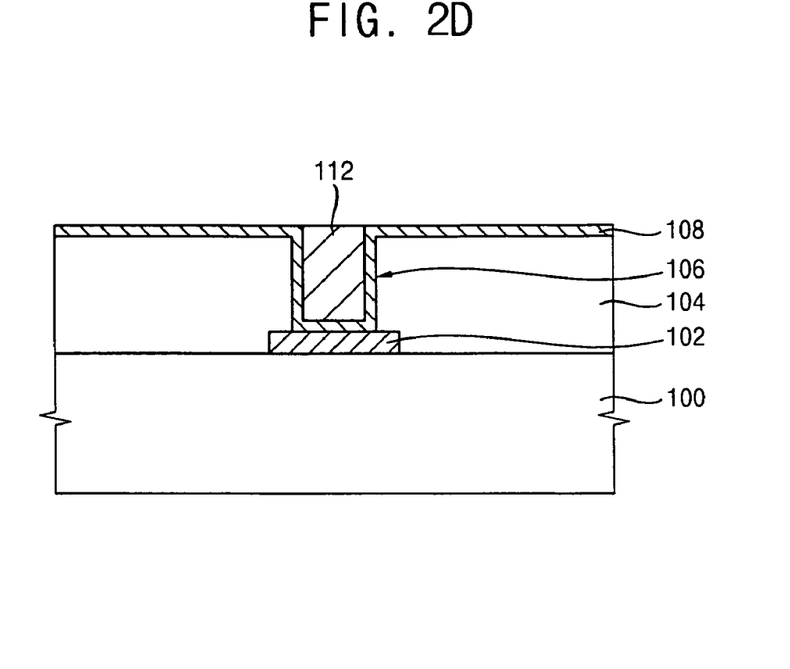

Referring to FIG. 2D, the metal layer 110 may be polished by, e.g., a CMP process. In particular, the metal layer 110 may be polished according to the process described previously with reference to FIG. 1 and using the slurry composition described previously. The metal layer 110 may be polished to remove an upper portion thereof.

For example, as illustrated in FIG. 2D, an upper portion of the metal layer 110 may be removed to expose an upper surface of the barrier layer 108, so only a portion of the metal layer 110 in the opening 106 may remain to form the metal wiring 112 in the opening 106. As a result, the metal wiring 112 that fills the opening 106 may be formed on the substrate 100, and an upper surface of the metal wiring 112 may be substantially level with an upper surface of the barrier layer 108. In another example, an upper portion of the metal layer 110 may be removed to expose an upper surface of the insulation layer 104, so the upper surface of the metal wiring in the openings 106 may be substantially level with an upper surface of the insulation layer 104.

The slurry composition used in the polishing process may include a polymeric polishing accelerating agent and an acidic aqueous solution. The polymeric polishing accelerating agent may include a backbone of hydrocarbon and a side substituent having at least one of a sulfonate ion ($SO_3^-$) and a sulfate ion ($OSO_3^-$). The slurry composition may be substantially same as the slurry composition described previously, and therefore, detailed description of its components and properties will not be repeated.

The slurry composition may be provided onto a polishing pad (not illustrated), and the upper surface of the metal layer 110 may be polished by contacting the metal layer 110 with the polishing pad via the slurry composition. In particular, the metal layer 110 may be polished according to the process described previously with respect to FIG. 1, and therefore, its details will not be repeated.

A slurry composition for polishing metal according to embodiments of the present invention may exhibit a high polishing rate, reduced corrosiveness, and enhanced dispersibility. Therefore, the slurry composition may rapidly polish the metal layer 110 with a high degree of planarization, and may suppress generation of defects, e.g., seams or voids, in the resultant metal wiring 112. As a result, the performance of a semiconductor device and a manufacturing yield thereof may be greatly improved.

Comparative Examples 7 and 8: slurry compositions for polishing metal were prepared by a substantially same process as the processes of Example 3 and Comparative Example 1, respectively, with the exception of using no abrasive, i.e., no cerium oxide. The compositions of Comparative Examples 7-8 were formed to evaluate electrochemical characteristics of the slurry compositions including the polymeric polishing accelerating agent as will be described in more detail below. The contents of the slurry compositions of Comparative Examples 7-8 are reported in Table 1. Water as a remainder of each slurry composition in Examples 1-6 and Comparative Examples 1-8 is omitted from Table 1.

TABLE 1

|  | Peroxide | Metal Catalyst | Organic Acid | Abrasive [Cerium | Carboxylic Acid salt | Polishing Accelerating Agent | |
|---|---|---|---|---|---|---|---|
|  | [$H_2O_2$ wt %] | [$Fe(NO_3)_3$ wt %] | [Citric Acid wt %] | Oxide wt %] | [KHP wt %] | Type | Amount [wt %] |
| Example 1 | 2 | 0.07 | 0.2 | 0.5 | — | Poly(vinyl sulfonate) | 0.005 |
| Example 2 | 2 | 0.07 | 0.2 | 0.5 | — | Poly(vinyl sulfonate) | 0.01 |
| Example 3 | 2 | 0.07 | 0.2 | 0.5 | — | Poly(vinyl sulfonate) | 0.05 |
| Example 4 | 2 | 0.07 | 0.2 | 0.5 | — | Poly(vinyl sulfonate) | 0.1 |
| Example 5 | 2 | 0.07 | 0.2 | 0.5 | 0.05 | Poly(vinyl sulfonate) | 0.05 |
| Example 6 | 2 | 0.07 | 0.2 | 0.5 | 0.05 | Poly(vinyl sulfate) | 0.05 |
| Comp. Ex. 1 | 2 | 0.07 | 0.2 | 0.5 | — | — | — |
| Comp. Ex. 2 | 2 | 0.07 | 0.2 | 0.5 | 0.01 | — | — |
| Comp. Ex. 3 | 2 | 0.07 | 0.2 | 0.5 | 0.05 | — | — |
| Comp. Ex. 4 | 2 | 0.07 | 0.2 | 0.5 | 0.1 | — | — |
| Comp. Ex. 5 | 2 | 0.07 | 0.2 | 0.5 | 0.5 | — | — |
| Comp. Ex. 6 | 2 | 0.07 | 0.2 | 0.5 | | — | — |
| Comp. Ex. 7 | 2 | 0.07 | 0.2 | — | | Poly(vinyl sulfonate) | 0.05 |
| Comp. Ex. 8 | 2 | 0.07 | 0.2 | — | | — | — |

EXAMPLES

Preparation of Slurry Compositions for Polishing Metal

Example 1: a slurry composition for polishing metal was prepared to include 2 wt % of hydrogen peroxide as an oxidizing agent, 0.07 wt % of iron (III) nitrate as a metal catalyst, 0.5 wt % of ceria as an abrasive, 0.2 wt % of citric acid as an organic acid, 0.005 wt % of poly(vinyl sulfonate, sodium salt) as a polymeric polishing accelerating agent, and a remainder of water. Sulfuric acid was added to the slurry composition until a pH of the slurry composition was about pH 3.

Examples 2-6: slurry compositions for polishing metal were prepared by a substantially same process as the process of Example 1, with the exception of modifying a type and/or an amount of the polymeric polishing accelerating agent and modifying an amount of a potassium hydrogen phthalate (KHP) used as a salt of an aromatic carboxylic acid. All the slurry compositions had a pH of about 3 by using sulfuric acid as a pH-controlling agent, and all the slurry compositions included either poly(vinyl sulfonate, sodium salt) or poly(vinyl sulfate, potassium salt) as the polymeric polishing accelerating agent. The contents of the slurry compositions of Examples 2-6 are reported in Table 1.

Comparative Examples 1-6: slurry compositions for polishing metal were prepared by a substantially same process as the process of Example 1, with the exception of using no polymeric polishing accelerating agent and modifying amounts of KHP used. The contents of the slurry compositions of Comparative Examples 1-6 are reported in Table 1.

Evaluation of Electrochemical Characteristics

An electrochemical experiment was carried out using the compositions prepared in Comparative Examples 7 and 8 in order to evaluate indirectly metal corrosion characteristics of the respective slurry compositions. The electrochemical experiment was performed with a potentiostat/galvanostat (EG&G Model #263A).

A wafer on which a tungsten layer was formed by a CVD process was used as a test sample. The wafer with the tungsten layer was cut to form a coupon wafer having dimensions of 2 cm×2 cm, and then the coupon wafer was employed as a working electrode. A platinum electrode was used as a counter electrode, and a saturated calomel electrode (SCE) was used as a reference electrode. Each of the slurry compositions of Comparative Examples 7 and 8 was set to be in contact with the working electrode, and electrical current was measured through the electrodes via the potentiostat. The results of the electrochemical experiment for the compositions prepared in Comparative Examples 7 and 8 are illustrated in FIG. 3.

Figure 3:
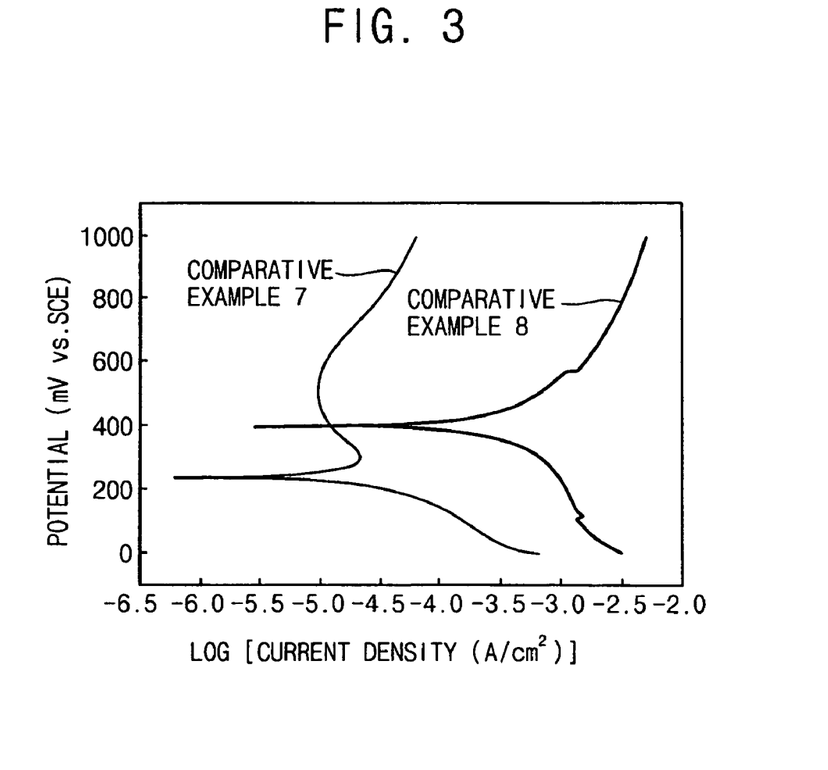
FIG. 3 illustrates a graph comparing electrochemical characteristics of slurry compositions according to existence/absence of poly(vinyl sulfonate) therein.

Referring to FIG. 3, the slurry composition including poly(vinyl sulfonate, sodium salt), i.e., the slurry composition of Comparative Example 7, exhibited a substantially reduced amount of electric current as compared with that of the slurry composition including no poly(vinyl sulfonate), i.e., the slurry composition of Comparative Example 8. The reduced amount of electric current through the slurry composition including poly(vinyl sulfonate, sodium salt) indicated that an oxidation reaction of the tungsten layer in contact with the slurry composition, i.e., between the oxidizing agent and the tungsten, was substantially suppressed by poly(vinyl sulfonate, sodium salt), and thus tungsten corrosion was inhibited or substantially reduced.

Evaluation of Polishing Rate and Etching Rate of Tungsten

The polishing and etching rates of tungsten were evaluated by determining dependency of the polishing/etching rates on an amount of the polymeric polishing accelerating agent and by determining dependency of the polishing/etching rates on an amount of aromatic carboxylic acid salt. To evaluate a relation between polishing/etching rates of tungsten and an amount of the polymeric polishing accelerating agent, a polishing process and a wet etching process were carried out using the slurry compositions of Examples 1-4 and Comparative Example 1. To evaluate a relation between the polishing/etching rates of tungsten and an amount of the aromatic carboxylic acid salt, a polishing process and a wet etching process were carried out using the slurry compositions of Comparative Examples 1-6.

1) Dependency on Amount of Polymeric Polishing Accelerating Agent

An adhesion layer and a barrier layer were sequentially formed on a silicon wafer, and a tungsten layer was formed on the barrier layer using a CVD apparatus to have a thickness of 6,000 angstroms. The prepared wafer was used as a sample for the test. A CMP process was performed on the wafer using each of the slurry compositions of Examples 1-4 and Comparative Example 1. A thickness of the tungsten layer was measured using a four-point probe before and after the CMP process, and the polishing rate was calculated from the thickness difference.

Figure 4:
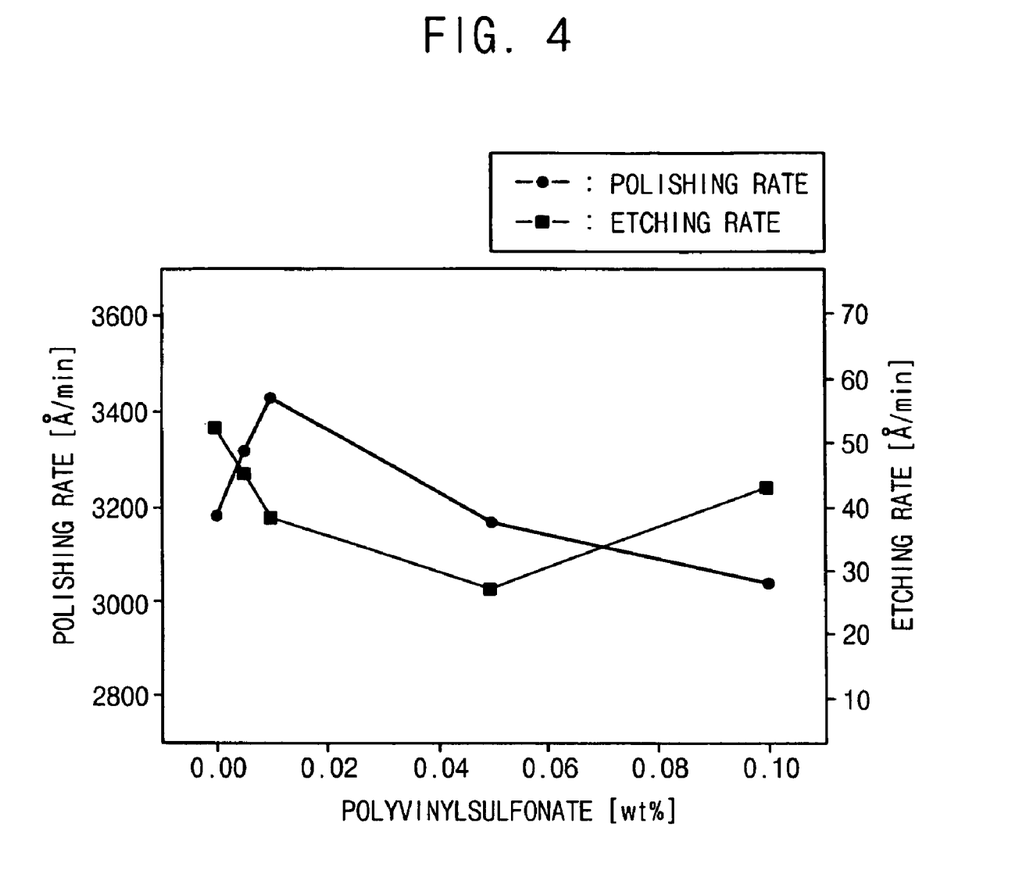
FIG. 4 illustrates a graph of polishing and etching rates of tungsten in accordance with content of poly(vinyl sulfonate) in respective slurry compositions.

Next, the tungsten layer was etched by immersing the wafer in each slurry composition prepared in Examples 1-4 and Comparative Example 1. A thickness variation caused by the etching process was measured using a field emission scanning electron microscope (FESEM), so an etching rate was calculated from the measured thickness difference. The results for the polishing and etching rates are reported in Table 2 and FIG. 4. FIG. 4 illustrates a graph of variations of tungsten polishing and etching rates in accordance with a content of poly(vinyl sulfonate).

TABLE 2

| | Poly (vinyl sulfonate) [wt %] | Polishing Rate [angstroms/min] | Etching Rate [angstroms/min] |
|---|---|---|---|
| Comparative Example 1 | 0 | 3,181 | 52 |
| Example 1 | 0.005 | 3,315 | 45 |
| Example 2 | 0.01 | 3,425 | 38 |
| Example 3 | 0.05 | 3,163 | 27 |
| Example 4 | 0.1 | 3,034 | 43 |

Referring to Table 2 and FIG. 4, as compared to Comparative Example 1, use of poly(vinyl sulfonate) in Examples 1-2 increased the polishing rate with respect to an increase of the amount of poly(vinyl sulfonate) and decreased the etching rate with respect to an increase of the amount of poly(vinyl sulfonate).

More specifically, it is noted that when the amount of poly(vinyl sulfonate) was less than or equal to about 0.01 wt %, i.e., Examples 1-2, the polishing rate of tungsten was increased, and when the amount of poly(vinyl sulfonate) was greater than about 0.01 wt %, i.e., Examples 3-4, the polishing rate of tungsten was gradually reduced. Therefore, it is noted that excessive amounts of poly(vinyl sulfonate) to the slurry composition may reduce the polishing rate of tungsten.

Similarly, it is noted that the etching rate of tungsten in Examples 1-3 was gradually decreased according to the increase of the amount of poly(vinyl sulfonate). Therefore, it is noted that when the amount of poly(vinyl sulfonate) in a slurry composition is above 0 wt % and is less than or equal to about 0.01 wt %, the polishing rate of tungsten may be enhanced, while chemical etching thereof, e.g., corrosion, may be inhibited or suppressed.

2) Dependency on an Amount of Aromatic Carboxylic Acid Salt

An adhesion layer and a barrier layer were sequentially formed on a silicon wafer, and a tungsten layer was formed on the barrier layer using a CVD apparatus to have a thickness of 6,000 angstroms. The prepared wafer was used as a sample for the test. A CMP process was performed on the wafer using each of the slurry compositions of Comparative Examples 1-6. A thickness of the tungsten layer was measured using a four-point probe before and after the CMP process, and the polishing rate was calculated from the thickness difference.

Next, the tungsten layer was etched by immersing the wafer in each slurry composition prepared in Examples 1-4 and Comparative Example 1. A thickness variation caused by the etching process was measured using a field emission scanning electron microscope (FESEM), so an etching rate was calculated from the measured thickness difference. The results for the polishing and etching rates are reported in Table 3 below.

TABLE 3

| | KHP [wt %] | Polishing Rate [angstroms/min] | Etching Rate [angstroms/min] |
|---|---|---|---|
| Comp. Ex. 1 | 0 | 3,181 | 52 |
| Comp. Ex. 2 | 0.01 | 2,998 | 45 |
| Comp. Ex. 3 | 0.05 | 2,877 | 39 |
| Comp. Ex. 4 | 0.1 | 2,621 | 36 |
| Comp. Ex. 5 | 0.5 | 2,253 | 42 |
| Comp. Ex. 6 | 1 | 1,898 | 39 |

As illustrated in Table 3, both the polishing rate and the etching rate of tungsten decreased according to an increase of KHP in the respective slurry compositions. When the amount of KHP was greater than about 0.5 wt %, the polishing rate of tungsten rapidly decreased, whereas the decrease of the etching rate was not large. Therefore, in some embodiments, the slurry composition may include the aromatic carboxylic acid salt, e.g., potassium hydrogen phthalate, in a range of about 0.001 wt % to about 0.5 wt %.

Evaluation of Polishing Rate of Tungsten and Recess of Tungsten Structure

To evaluate a variation of a polishing rate of tungsten and a recess of a tungsten structure according to addition of the polymeric polishing accelerating agent, a polishing process was carried out using the slurry compositions prepared in Example 5 and Comparative Example 1. The tungsten structure used in the polishing process was a tungsten plug and a tungsten wiring formed by performing a single damascene process.

An insulation structure having a hole used for forming a plug, e.g., by a single damascene process, was formed on a substrate, followed by forming a barrier layer on the insulation layer. A tungsten layer having a thickness of 1,500 angstroms was formed on the barrier layer and the insulation structure to fill the hole by using a CVD apparatus. A CMP process was performed on the tungsten layer to expose the insulation layer, so a tungsten structure was formed in the hole.

The CMP process was performed on the tungsten layer using each of the slurry compositions of Example 5 and Comparative Example 1, followed by measuring polishing rates of the tungsten layer. In addition, a degree of a recess formed on the tungsten structures, i.e. a tungsten plug and a tungsten wiring in the hole, was measured using an atomic force microscope (AFM) and an FESEM. The recess denotes a height difference between a top surface of the insulation layer adjacent to the tungsten structure and a top surface of the tungsten structure. The results are reported in Table 4 below.

TABLE 4

| | Poly(vinyl sulfonate) | KHP | Polishing Rate [angstroms/min] | Recess of Tungsten Structure | |
|---|---|---|---|---|---|
| | | | | Plug [angstroms] | Wiring [angstroms] |
| Comp. Ex. 1 | — | — | 2,992 | 339 | 322 |
| Example 5 | 0.05 | 0.05 | 3,119 | 245 | 241 |

Referring to Table 4, the slurry composition including the polymeric polishing accelerating agent, e.g., poly(vinyl sulfonate), exhibited a substantially higher polishing rate of tungsten than that of the slurry composition not including the polymeric polishing accelerating agent. Further, the slurry composition including the polymeric polishing accelerating agent and the aromatic carboxylic acid salt exhibited a reduced recess of the tungsten structure, i.e., the recess of the tungsten was decreased by only about 25% to about 30%. The recess of the tungsten structure may be mainly generated by a chemical etching of tungsten, and the reduced recess indicated that the polymeric polishing accelerating agent and the aromatic carboxylic acid salt suppressed the chemical etching of the tungsten to reduce the etching rate thereof. Therefore, it may also be confirmed that generation of seams or voids in a metal plug or a metal wiring can be prevented or substantially minimized by reducing a recess of a metal structure in a polishing process.

Although it is not illustrated in the tables or figures, the slurry composition including poly(vinyl sulfate, potassium salt) of Example 6 exhibited an increase of a polishing rate of tungsten and a decrease of a recess in the plug and the wiring, as the slurry composition of Example 5.

According to example embodiments of the present invention, a slurry composition for polishing metal may include a polymeric polishing accelerating agent having a side substituent such as a sulfonate ion and/or a sulfate ion to enhance a polishing rate and to reduce corrosiveness of metal, e.g., tungsten, and additionally to improve the dispersibility of an abrasive in the slurry composition. Therefore, the slurry composition may rapidly polish metal with a high degree of planarization, and may suppress generation of defects, e.g., a metal plug or a metal wiring, in a conductive structure. As a result, the performance of a semiconductor device and a manufacturing yield may be greatly improved.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A method of polishing a metal object, comprising:
preparing a slurry composition including a polymeric polishing accelerating agent and an acidic aqueous solution with an abrasive, the polymeric polishing accelerating agent including a backbone of hydrocarbon and a side substituent having at least one of a sulfonate ion ($SO_3^-$) and a sulfate ion ($OSO_3^-$);
providing the slurry composition to a polishing pad; and
polishing a surface of the metal object by contacting the metal object with the polishing pad,
wherein the polymeric polishing accelerating agent includes a polymer having at least one of repeating units represented by Formula 1 and Formula 2, wherein $R_1$ and $R_2$ independently represent a hydrogen atom or a $C_1$-$C_4$ alkyl group, $X^+$ and $Y^+$ independently represent a hydrogen ion, an alkali metal ion, an ammonium ion, or a $C_1$-$C_{10}$ alkylammonium ion, and $n_1$ and $n_2$ independently represent an integer in a range of about 10 to about 5,000.

2. The method as claimed in claim 1, wherein the metal object includes at least tungsten.

3. The method as claimed in claim 2, wherein the slurry composition has a pH in range of about 2 to about 4.

4. The method as claimed in claim 1, wherein the polymeric polishing accelerating agent includes one or more of a homopolymer having a repeating unit represented by Formula 1 or Formula 2, a copolymer having a repeating unit represented by Formula 1 and a repeating unit represented by Formula 2, a copolymer having at least one repeating unit represented by Formula 1 or Formula 2 and at least one repeating unit including a vinyl monomer, an acryl monomer, an alkylene oxide monomer, or an olefin monomer.

5. The method as claimed in claim 1, wherein the slurry composition includes the polymeric polishing accelerating agent in an amount of about 0.0001% to about 1% by weight based on a total weight of the slurry composition.

6. The method as claimed in claim 5, wherein the acidic aqueous solution includes the abrasive in an amount of about 0.1% to about 20% by weight, an oxidizing agent in an amount of about 0.1% to about 10% by weight, and a metal catalyst in an amount of about 0.0001% to about 1% by weight, based on a total weight of the composition.

7. The method as claimed in claim 1, wherein the slurry composition further comprises salt of an aromatic carboxylic acid.

8. The method as claimed in claim 7, wherein the slurry composition includes the salt of the aromatic carboxylic acid in an amount of about 0.001% to about 0.5% by weight based on a total weight of the composition.

9. The method as claimed in claim 8, wherein the salt of the aromatic carboxylic acid includes potassium hydrogen phthalate.

10. A method of forming a metal wiring, comprising:
forming a conductive structure on a substrate;
forming an insulation layer on the substrate to cover the conductive structure;

partially removing the insulation layer to form an opening in the insulation layer, the opening exposing the conductive structure;
forming a metal layer on the insulation layer to fill the opening; and
polishing the metal layer using a slurry composition to form the metal wiring in the opening, the slurry composition including a polymeric polishing accelerating agent and an acidic aqueous solution with an abrasive, the polymeric polishing accelerating agent including a backbone of hydrocarbon and a side substituent having at least one of a sulfonate ion ($SO_3^-$) and a sulfate ion ($OSO_3^-$),
wherein the polymeric polishing accelerating agent includes a polymer having at least one of repeating units represented by Formula 1 and Formula 2, Formula 1

Formula 2 wherein $R_1$ and $R_2$ independently represent a hydrogen atom or a $C_1$-$C_4$ alkyl group, $X^+$ and $Y^+$ independently represent a hydrogen ion, an alkali metal ion, an ammonium ion, or a $C_1$-$C_{10}$ alkylammonium ion, and $n_1$ and $n_2$ independently represent an integer in a range of about 10 to about 5,000.

11. The method as claimed in claim 10, wherein the metal layer includes at least tungsten.

* * * * *